(12) United States Patent
Son et al.

(10) Patent No.: US 9,397,797 B2
(45) Date of Patent: Jul. 19, 2016

(54) METHOD AND APPARATUS FOR CONTROLLING SLEEP MODE OPERATION IN A COMMUNICATION SYSTEM

(75) Inventors: Yeong-Moon Son, Yongin-si (KR); Jung-Je Son, Yongin-si (KR); Hyun-Jeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 12/720,066

(22) Filed: Mar. 9, 2010

(65) Prior Publication Data

US 2010/0232331 A1 Sep. 16, 2010

(30) Foreign Application Priority Data

Mar. 11, 2009 (KR) ........................ 10-2009-0020525

(51) Int. Cl.
*G08C 17/00* (2006.01)
*H04L 1/18* (2006.01)
*H04W 52/02* (2009.01)
*H04W 72/04* (2009.01)

(52) U.S. Cl.
CPC ............ *H04L 1/188* (2013.01); *H04W 52/0216* (2013.01); *H04L 1/1812* (2013.01); *H04W 72/042* (2013.01); *Y02B 60/50* (2013.01)

(58) Field of Classification Search
CPC ...... G08C 17/00; H04L 1/188; H04L 1/1812; H04W 52/0216; H04W 72/042; Y02B 60/50
USPC ......................................................... 370/311
See application file for complete search history.

(56) References Cited

U.S. PATENT DOCUMENTS

| | | | |
|---|---|---|---|
| 7,924,756 B2 * | 4/2011 | Son et al. ....................... 370/311 |
| 2004/0218556 A1 | 11/2004 | Son et al. |
| 2004/0235536 A1 | 11/2004 | Kim et al. |
| 2005/0070340 A1 | 3/2005 | Kim |
| 2005/0100801 A1 | 5/2005 | Hirakawa et al. |
| 2005/0122936 A1 | 6/2005 | Son et al. |

(Continued)

FOREIGN PATENT DOCUMENTS

| | | |
|---|---|---|
| CN | 1698293 A | 11/2005 |
| CN | 101006664 A | 7/2007 |

(Continued)

OTHER PUBLICATIONS

"Part 16: Air Interface for Fixed and Mobile Broadband Wireless Access System", Draft Amendment to IEEE Standard for Local and metropolitan area networks, 2009, New York, NY.

*Primary Examiner* — Ayaz Sheikh
*Assistant Examiner* — Hai-Chang Hsiung
(74) *Attorney, Agent, or Firm* — Jefferson IP Law, LLP

(57) ABSTRACT

A method and apparatus for controlling a sleep mode operation of a Mobile Station (MS) in a communication system, in which the sleep mode operates according to a sleep cycle including a listening window corresponding to an awake mode and a sleep window corresponding to a sleep state. The method includes starting a preset timer if there is a transmission of data between the MS and a Base Station (BS) during the listening window, restarting the timer upon receiving at least one of UpLink (UL) data, DownLink (DL) data and MAP Information Element (IE) indicating resource allocation from the BS during the listening window, maintaining the listening window until the timer expires, and transitioning to the sleep window if the timer expires.

24 Claims, 5 Drawing Sheets

(56) References Cited

U.S. PATENT DOCUMENTS

| | | | |
|---|---|---|---|
| 2005/0249118 A1* | 11/2005 | Terry et al. | 370/235 |
| 2005/0288022 A1* | 12/2005 | Ryu et al. | 455/439 |
| 2006/0039320 A1* | 2/2006 | Kang et al. | 370/328 |
| 2006/0154663 A1* | 7/2006 | Son et al. | 455/435.1 |
| 2007/0202835 A1* | 8/2007 | Son et al. | 455/343.1 |
| 2007/0242786 A1* | 10/2007 | Kim et al. | 375/354 |
| 2007/0298778 A1* | 12/2007 | Chion et al. | 455/422.1 |
| 2007/0298836 A1 | 12/2007 | Yanover | |
| 2008/0075026 A1* | 3/2008 | Son et al. | 370/311 |
| 2008/0153426 A1 | 6/2008 | Son et al. | |
| 2009/0052361 A1 | 2/2009 | Cai et al. | |
| 2009/0070650 A1* | 3/2009 | Bourlas et al. | 714/748 |
| 2009/0196197 A1* | 8/2009 | DiGirolamo et al. | 370/252 |

FOREIGN PATENT DOCUMENTS

| | | |
|---|---|---|
| CN | 101091406 A | 12/2007 |
| JP | 11-313370 A | 11/1999 |
| JP | 2008-517515 A | 5/2008 |
| KR | 10-2005-0045937 A | 5/2005 |
| KR | 10-2008-0027734 A | 3/2008 |
| RU | 2007 125 980 A | 1/2009 |
| WO | 2007/120022 A1 | 10/2007 |
| WO | 2008/085000 A1 | 7/2008 |

* cited by examiner

METHOD AND APPARATUS FOR CONTROLLING SLEEP MODE OPERATION IN A COMMUNICATION SYSTEM

PRIORITY

This application claims the benefit under 35 U.S.C. §119 (a) of a Korean patent application filed in the Korean Intellectual Property Office on Mar. 11, 2009 and assigned Serial No. 10-2009-0020525, the entire disclosure of which is hereby incorporated by reference.

BACKGROUND OF THE INVENTION

1. Field of the Invention

The present invention relates to a communication system. More particularly, the present invention relates to a method and apparatus for controlling a sleep mode operation of a mobile station.

2. Description of the Related Art

Communication systems have evolved to offer users high-speed services for transmitting/receiving a large amount of data. These communication systems, for example, include an Institute of Electrical and Electronics Engineers (IEEE) standard 802.16e communication system. A normal mode in the IEEE standard 802.16e communication system refers to a state in which the communication between a Mobile Station (MS) and a Base Station (BS) is always maintained.

In the IEEE standard 802.16e communication system, an MS monitors a DownLink (DL) to determine whether data is received from a BS. The MS monitors the DL even when the BS has no data to transmit to the MS, which consumes its power unnecessarily.

Since the IEEE standard 802.16e communication system considers MS's mobility, the MS's power consumption serves as an important factor in an overall system performance and affects the MS's mobility as well. To minimize the MS's power consumption, a sleep mode and an awake mode corresponding to the sleep mode have been provided between an MS and a BS.

FIG. 1 is a diagram illustrating a conventional method for performing a sleep mode operation in a communication system.

Referring to FIG. 1, an MS 100 remaining in an awake mode transmits a MOBile SLeeP REQuest (MOB_SLP-REQ) message to a BS 110 to transition to a sleep mode in step 101. Upon receiving the MOB_SLP-REQ message, the BS 110 determines whether to approve the mode transition to the sleep mode of the MS 100, considering situations of the BS 110 and the MS 100, and transmits a MOBile SLeeP ReSPonse (MOB_SLP-RSP) message to the MS 100 based on the determination result in step 103. The MOB_SLP-RSP message includes a listening window parameter indicating a listening window. In the listening window of the sleep mode, if the BS 110 has data to transmit to the MS 100, the BS 110 transmits a MOBile TRaFfic INDication (MOB_TRF-IND) message including an Identifier (ID) of the MS 100 to the MS 100 during the listening window.

Instead of responding to the sleep mode request (i.e., request for transition to or release of the sleep mode) of the MS 100, the BS 110 may first transmit a sleep mode request to the MS 100 in an unsolicited manner. That is, the BS 110 requests the MS 100 to enter or exit the sleep mode by first transmitting the MOB_SLP-RSP message without receiving the MOB_SLP-REQ message of the MS 100.

Upon receiving the MOB_SLP-RSP message from the BS 110, the MS 100 starts a sleep mode operation according to the MOB_SLP-RSP message. The MS 100 performs the sleep mode operation according to the listening window parameter included in the MOB_SLP-RSP message. When the MS 100 has data to transmit to the BS 110 while operating in the sleep mode, the MS 100 may transition from the sleep mode to the awake mode immediately.

If the BS 110 has no data to transmit to the MS 100, the BS 110 transmits a MOB_TRF-IND message with no ID of the MS 100 in the listening window of the sleep mode in step 105. The MOB_TRF-IND message includes a negative indication for the MS 100 since it does not correspond to the MS 100. The MS 100 decodes the MOB_TRF-IND message and then continuously maintains the sleep mode, when the ID of the MS 100 is not included.

If the BS 110 has data to transmit to the MS 100, i.e., if a Protocol Data Unit (PDU) for the MS 100 has been provided from the network, the BS 110 transmits a MOB_TRF-IND message with an ID of the MS 100 in step 107. Since the MOB_TRF-IND message corresponds to the MS 100, it becomes a positive indication for the MS 100. The MS 100 decodes the MOB_TRF-IND message and transitions to the awake mode and receives the data from the BS 110, determining that the ID of the MS 100 is included.

After the data transmission/reception between the MS 100 and the BS 110 is completed, the MS 100 and the BS 110 exchange additional MOB_SLP-REQ message and MOB_SLP-RSP message to make a transition back to the sleep mode, causing transmission of unnecessary messages, waste of UpLink (UL) and DL resources, and power consumption. In addition, the MS 100 should perform bandwidth ranging by transmitting to the BS 110 a BandWidth REQuest (BW-REQ) message in order to be allocated a bandwidth for transmitting an additional MOB_SLP-REQ message, which delays the time for which the MS 100 makes a transition to the sleep mode.

The MOB_SLP-REQ message includes a Power_Saving_Class_Type field and a Traffic_Triggered_Wakening_Flag (TTWF) field. The Power_Saving_Class_Type field is used to define one of the types described below.

1) Type 1 indicates a class corresponding to a conventional sleep mode operation. In this class type, an MS transitions to the awake mode, when data transmission/reception occurs in the listening window or when it receives a MOB_TRF-IND message with a positive indication.

2) Type 2 has a fixed sleep window. In this class type, an MS performs data transmission/reception in a listening window, and also performs data transmission/reception in a next scheduled listening window after the fixed sleep window.

3) Type 3 denotes, compared with Type 1 and Type 2 in which an MS continuously maintains the sleep mode unless it receives a mode transition request message, a class of automatically exiting the sleep mode after one sleep mode operation, i.e., after one sleep window. Type 3 is used for management messages or multicast traffic.

The TTWF field is applied only to the Power Saving Class Type 1. Specifically, the TTWF is used when an MS intends to maintain the sleep mode even though data is generated in the listening window.

For example, when TTWF=0, an MS transmits/receives data during the listening window and then transitions back to the sleep mode at the end of the listening window, i.e., at the beginning of the sleep window. The MS exits the sleep mode and transitions to the awake mode, (i) when the BS intends to transmit a Medium Access Control (MAC) Service Data Unit (SDU) for a power saving class during the listening window, (ii) when the MS transmits a BW-REQ message for a connection for the power saving class, or (iii) when the MS receives a MOB_TRF-IND message with a positive indication, i.e., an ID of the MS, from the BS. In other cases, the MS may exit the sleep mode through transaction of the MOB_SLP-REQ message and the MOB_SLP-RSP message.

On the other hand, when TTWF=1, the MS exits the sleep mode and transitions to the awake mode when the MS receives a Packet Data Unit (PDU) from the BS during the listening window or when the MS receives a management message indicating the exit of the sleep mode, e.g., a MOB_SLP-RSP message or a DL Sleep Control Extended Subheader. Also, the MS exits the sleep mode and transitions to the awake mode, even when data to be transmitted is generated in the MS or when the MS transmits to the BS a management message indicating the exit of the sleep mode, i.e., a MOB_SLP-REQ message, a BW-REQ message or a UL Sleep Control Header. In other words, when TTWF=1, the MS transitions to the awake mode when traffic data or a relevant management message is generated during the listening window.

As described above, in a sleep mode operation of the IEEE standard 802.16e communication system, the Power Saving Class Type 1 is used to maintain or deactivate the sleep mode when the MS receives a MAC SDU from the BS in the listening window according to the TTWF. Conventionally, however, a clear definition has not been given of the time at which the MS transitions back to the sleep mode after an expiration of the listening window when it intends to maintain the sleep mode. The TTWF is initially set in the MOB_SLP-REQ message and the MOB_SLP-RSP message transmitted/received by the MS and the BS. In some cases, however, a value of the TTWF should be changed during the sleep mode operation. In this case, a concrete operation is needed to change the value of the TTWF.

Also, when an MS and a BS simultaneously transmit their sleep mode requests to each other, i.e., when the MS transmits a MOB_SLP-REQ message and at the same time, the BS transmits a MOB_SLP-RSP message in an unsolicited manner before recognizing the MOB_SLP-REQ message, the MS may not determine whether the MOB_SLP-RSP message received from the BS is a response to its MOB_SLP-REQ message or has been transmitted in an unsolicited manner, which may cause a disparity of sleep mode-related parameters between the MS and the BS, leading to a malfunction of the sleep mode. Since the conventional IEEE standard 802.16e sleep mode operation does not consider the disparity, the MS may misunderstand that the BS has approved its request, based on only a 'Sleep_Approved' field that is included in the MOB_SLP-RSP message and indicates the approval/non-approval of activation or deactivation of the power saving class. To prevent this, the MS should verify all parameters included in the MOB_SLP-RSP message one by one to determine whether the parameters are identical to its request values.

Further, when it is negotiated between the MS and the BS to indicate a presence/absence of DL traffic using a MOB_TRF-IND message, i.e., when a 'TRF-IND_required' field is set to 1, which is included in the MOB_SLP-REQ/RSP message and indicates that the BS transmits at least one MOB_TRF-IND message to the MS during every listening window in the Power Saving Class Type 1, the BS should transmit the MOB_TRF-IND message during the listening window of the MS. Therefore, the BS transmits the MOB_TRF-IND message even when it has no DL traffic to transmit to the MSs that will be awake during the listening window, thereby causing a waste of resources. In addition, when the BS does not transmit the MOB_TRF-IND message, the MS may not determine whether the BS did not transmit the MOB_TRF-IND message, or the MS has failed to receive the MOB_TRF-IND message even though the BS transmitted the MOB_TRF-IND message. In this case, the MS is awakened from the sleep mode and determines that it has failed to receive the MOB_TRF-IND message.

Therefore, a need exists for a method and apparatus for controlling a sleep mode operation of a mobile station to reduce power consumption in a communication system.

SUMMARY OF THE INVENTION

An aspect of the present invention is to address at least the above-mentioned problems and/or disadvantages and to provide at least the advantages described below. Accordingly, an aspect of the present invention is to provide a method and apparatus for controlling a sleep mode operation in a communication system.

Another aspect of the present invention provides a sleep mode operation control method and apparatus for reducing the waste of resources in a communication system.

A further another aspect of the present invention provides a sleep mode operation control method and apparatus for reducing power consumption of an MS in a communication system.

In accordance with an aspect of the present invention, a method for controlling a sleep mode by a Mobile Station (MS) in a communication system, in which the speed mode operates according to a sleep cycle including a listening window corresponding to an awake state and a sleep window corresponding to a sleep state, is provided. The method includes starting a preset timer if there is a transmission of data between the MS and a Base Station (BS) during the listening window, restarting the timer upon receiving at least one of an ACKnowledgment (ACK) for Uplink (UL) data, Downlink (DL) data, and a MAP Information Element (IE) indicating resource allocation, from the BS during the listening window, maintaining the listening window until the timer expires, and transitioning to the sleep window if the timer expires.

In accordance with another aspect of the present invention, a method for controlling a sleep mode of a Mobile Station (MS) by a Base Station (BS) in a communication system, in which the sleep mode operates according to a sleep cycle including a listening window corresponding to an awake state and a sleep window corresponding to a sleep state, is provided. The method includes starting a preset timer when there is a transmission of data between the MS and the BS during the listening window, restarting the timer upon transmitting at least one of an ACK for Uplink (UL) data, Downlink (DL) data, and a MAP Information Element (IE) indicating resource allocation, to the MS during the listening window, determining whether the MS is maintaining the listening window, until the timer expires, and determining whether the MS has transitioned to the sleep window, if the timer expires.

In accordance with a further another aspect of the present invention, a Mobile Station (MS) apparatus for controlling a sleep mode in a communication system, in which the speed mode operates according to a sleep cycle including a listening window corresponding to an awake state and a sleep window corresponding to a sleep state, is provided. The MS apparatus includes a controller for starting a preset timer if there is a transmission of data between the MS and a Base Station (BS) during the listening window, and for restarting the timer upon receiving at least one of an ACK for Uplink (UL) data, Downlink (DL) data, and a MAP Information Element (IE) indicating resource allocation, from the BS during the listening window, and a transceiver for maintaining the listening window until the timer expires, and for transitioning to the sleep window if the timer expires.

In accordance with yet another aspect of the present invention, a Base Station (BS) apparatus for controlling a sleep mode of a Mobile Station (MS) in a communication system, in which the sleep mode operates according to a sleep cycle including a listening window corresponding to an awake state and a sleep window corresponding to a sleep state, is provided. The BS apparatus includes a controller for starting a preset timer if there is a transmission of data between the MS and the BS during the listening window, for restarting the timer upon transmitting at least one of an ACK for Uplink (UL) data, Downlink (DL) data, and a MAP Information Element (IE) indicating resource allocation, to the MS during the listening window, for determining whether the MS is maintaining the listening window, until the timer expires, and for determining whether the MS has transitioned to the sleep window, if the timer expires, and a transceiver for exchanging data and messages with the MS under control of the controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Figure 1:
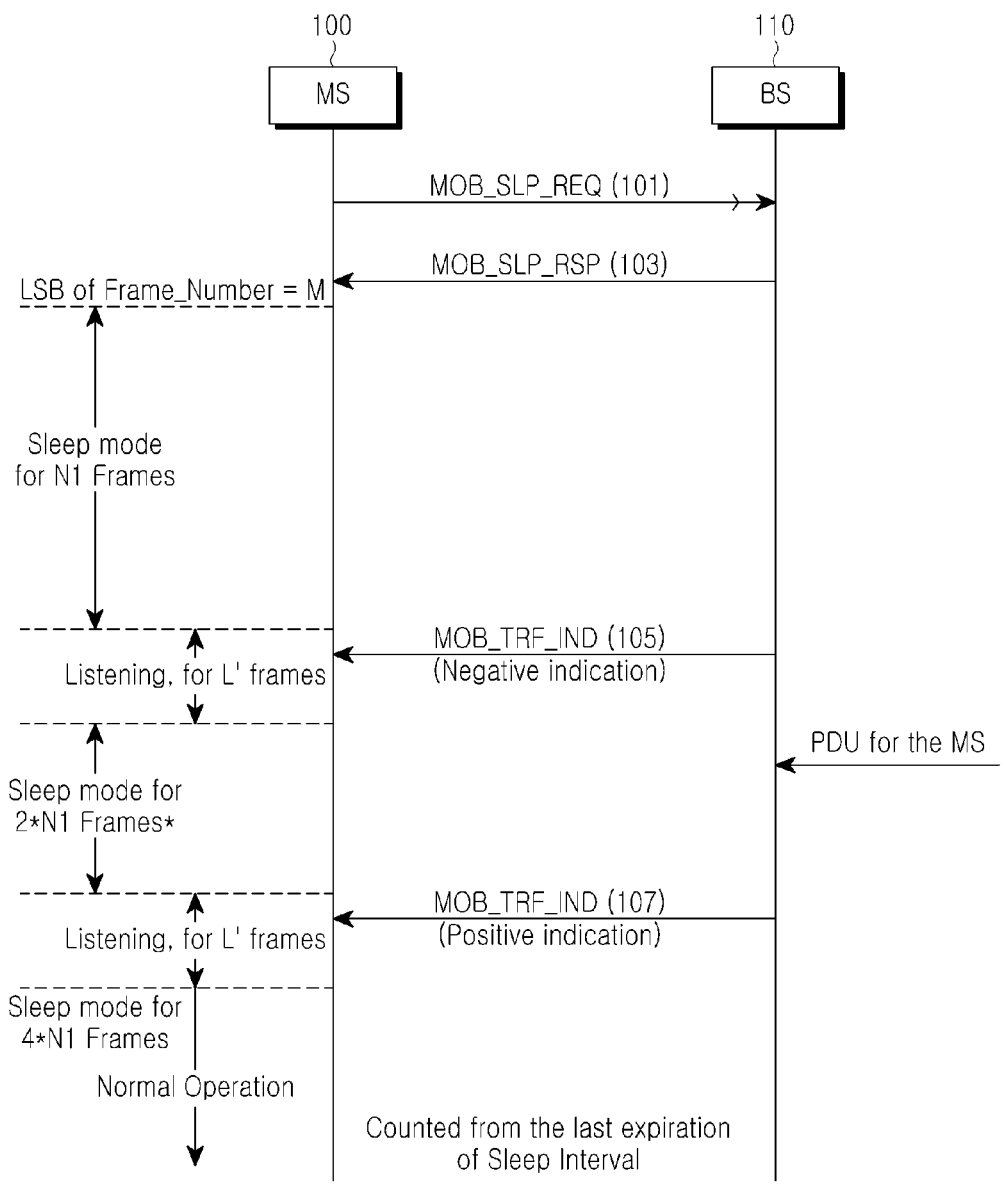
FIG. 1 is a diagram illustrating a conventional method for performing a sleep mode operation in a communication system.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limited the invention as defined by the appended claims and their equivalents.

It is to be understood that the singular forms "a," "and," and "the" include plural referents unless the context clearly dictates otherwise. Thus, for example, reference to "a component surface" includes reference to one or more of such surfaces.

Exemplary embodiments of the present invention provide a method and apparatus for controlling a sleep mode operation in a communication system. While the sleep mode operation control method will be described herein with reference to the Institute of Electrical and Electronics Engineers (IEEE) standard 802.16e and a communication system based thereon, the sleep mode operation control method may also be applied to other communication systems. In addition, in this specification, a description will be given below of a method for controlling the sleep mode operation by one MS and a BS in the communication system. However, the sleep mode operation control method may be applicable even when multiple MSs exist in the communication system.

The MS and the BS first exchange a MOBile SLeeP REQuest (MOB_SLP-REQ) message and a MOBile SLeeP ReSPonse (MOB_SLP-RSP) message, for mode transition to the sleep mode. The sleep mode includes a sleep window, and a listening window. A sleep mode enter time, length of the sleep window and length of the listening window are determined when the MOB_SLP-REQ message and the MOB_SLP-RSP message are transmitted/received. A state in which power is consumed due to data transmission/reception between the MS and the BS or due to the waiting state is defined as an awake state, and the state in which the MS does not transmit and receive data to/from the BS to reduce power consumption is defined as a sleep state. The awake state and the sleep state both correspond to the sleep mode. That is, the sleep mode is divided into the awake state corresponding to the listening window and the sleep state corresponding to the sleep window (i.e., other window except for the listening window).

The MS may wake up in a listening window pre-negotiated with the BS. However, when the pre-negotiated listening window is not included in a first frame in a superframe structure including multiple frames, the MS may wake up in the pre-negotiated listening window and also in the first frame.

Similarly, in the case of a communication system using the superframe structure, operation units in which the MS transitions to the sleep state and the units representing the listening window constitute a superframe. That is, the MS may transition to the sleep state in the first frame of the superframe. Likewise, the MS may wake up from the listening window in the first frame of another superframe. Even though the MS does not transition to the sleep state in the first frame of the superframe, the time at which the MS wakes up in the listening window should be the first frame of another superframe.

An exemplary embodiment of the present invention provides an operation in which the MS transitions back to the sleep state when no data transmission/reception occurs between the MS and the BS after the MS, which entered the sleep mode and was staying in the sleep window, has transitioned to the awake state in the listening window and received a MOBile TRaFfic INDication (MOB_TRF-IND) message from the BS.

It will be assumed herein that data transmission/reception between the MS and the BS is performed by the BS transmitting data to the MS after transmitting a MOB_TRF-IND message to the MS. However, the data transmission method for power consumption reduction may also be applied when the data transmission/reception is performed without transmission of the MOB_TRF-IND message.

Messages for supporting the sleep mode and awake mode operations are described in more detail below.

The MOB_SLP-REQ message is transmitted to the BS when the MS staying in the awake mode intends to transition to the sleep mode. The MOB_SLP-REQ message includes parameters or Information Elements (IEs) required by the MS to make a transition to the sleep mode, and an example of its format is shown in Table 1 below.

TABLE 1

| Syntax | Size (bits) | Notes |
|---|---|---|
| MOB_SLP-REQ_Message_format ( ) { | | |
|   Management message type=50 | 8 | |
|   Number of Classes | 8 | Number of power saving classes |
|   for (i=0; i<Number_of_Classes; i++) { | | |
|     Definition | 1 | |
|     Operation | 1 | |
|     Power_saving_Class_ID | 6 | |
|     if (Operation == 1) | | |
|       Start_frame_number | 6 | |
|       reserved | 2 | |
|     } | | |
|   if (Definition = 1) { | — | — |
|     Power_Saving_Class_Type | 2 | — |
|     Direction | 2 | |
|     Traffic_triggered_wakening_flag | 1 | |
|     reserved | 3 | |
|     initial-sleep window | 8 | |
|     Listening window | 8 | |
|     final-sleep window base | 10 | |
|     final-sleep window exponent | 3 | |
|     Number_of_Sleep_CIDs | 3 | |
|     for (i=0; i<Number_of_Sleep_CIDs; i++) { | — | |
|       CID | 16 | |
|     } | — | |
|   } | — | |
|   TLV encoded information | variable | |
| } | | |

As shown in Table 1, the MOB_SLP-REQ message may include at least one of the IEs described below.

'Management Message Type' is information indicating a type of message being transmitted, and Management Message Type=50 denotes that the message is a MOB_SLP-REQ message. 'Number of Classes' indicates the number of power saving classes to be included in the MOB_SLP-REQ message. 'Definition' indicates a definition of a new power saving class or an old power saving class. 'Operation' indicates activation or deactivation of the power saving class. 'Power_Saving_Class_ID' indicates an ID for identifying the power saving class indicating a current operation. 'Start_frame_number' indicates the time at which the power saving class is to be activated, i.e., indicates a start frame number for the first sleep window. 'Power_Saving_Class_Type' indicates a type of the power saving class. The types of power saving classes are described below.

1) Type 1 indicates a class corresponding to a conventional sleep mode operation. In this class type, an MS transitions to the awake mode, when data transmission/reception occurs in the listening window or when it receives a MOB_TRF-IND message with a positive indication.

2) Type 2 has a fixed sleep window. In the type 2 class type, an MS performs data transmission/reception in a listening window, and also performs data transmission/reception in a next scheduled listening window after the fixed sleep window.

3) Type 3 denotes, compared with Type 1 and Type 2 in which an MS continuously maintains the sleep mode unless it receives a mode transition request message, a class of automatically exiting the sleep mode after one sleep mode operation, i.e., after one sleep window. Type 3 is used for management messages or multicast traffic.

In addition, 'Direction' indicates UpLink (UL) or DownLink (DL). 'Traffic_Triggered_Wakening_Flag (TTWF)' is applied only to Type 1 meaning a type of the power saving class, which is indicated by Power_Saving_Class_Type. That is, the TTWF is used when the MS intends to maintain the sleep mode as in Type 2 in the power saving class of Type 1 and to transmit/receive data during the listening window.

'Initial-sleep Window' indicates an initial length of the sleep window, and 'Listening Window' indicates an assigned duration of the listening window. The length of the sleep window is doubled at every expiration of the listening window, and the maximum length of the sleep window is determined based on two parameters 'final-sleep window base' and 'final-sleep window exponent' and is defined as '(final-sleep window base)*2^(final-sleep window exponent)'. Further, 'Number_of_Sleep_CIDs' indicates the number of unicast Connection IDs (CIDs) corresponding to the power saving class.

The MOB_SLP-RSP message is transmitted from the BS to the MS to indicate whether to approve the mode transition to the sleep mode of the MS considering the situations of the BS and the MS, or is transmitted from the BS to the MS to indicate an unsolicited indication. The MOB_SLP-RSP message includes parameters or IEs that the MS needs to operate in the sleep mode, and an example of its format is shown in Table 2 below.

TABLE 2

| Syntax | Size (bits | Notes |
|---|---|---|
| MOB_SLP-RSP_Message_format ( ) { | | |
|   Management message type=51 | 8 | |
|   Number of Classes | 8 | Number of power saving classes |
|   for (i=0; i<Number_of_Classes; i++) | | |
|   { | | |
|     Length of Data | 7 | |
|     Sleep Approved | 1 | |
|     Definition | 1 | |
|     Operation | 1 | |
|     Power_Saving_Class_ID | 6 | |
|     if (Sleep Approved == 1) { | | |
|       if (Operation = 1) { | | |
|         Start_frame_number | 6 | |
|         Reserved | 2 | |
|       } | | |
|     if (Definition = 1) { | — | — |
|       Power_Saving_Class_Type | 2 | |
|       Direction | 2 | |
|       initial sleep window | 8 | — |
|       listening window | 8 | |
|       final-sleep window base | 10 | |
|       final-sleep window exponent | 3 | |

TABLE 2-continued

| Syntax | Size (bits) | Notes |
|---|---|---|
| TRF-IND_Required | 1 | |
| Traffic_triggered_wakening_flag | 1 | |
| Reserved | 1 | |
| if (TRF-IND required) { | | |
|   SLPID | 10 | |
|   Reserved | 2 | |
| } | | |
| Number_of_CIDs | 4 | |
| for (i=0; i<Number_of_CIDs; i++) { | | |
|   CID | 16 | |
| } | | |

The MOB_SLP-RSP message is transmitted based on a Basic CID of the MS and may also include at least one of the IEs described below.

'Management Message Type' is information indicating a type of message being transmitted, and Management Message Type=51 denotes that the message is a MOB_SLP-RSP message. 'Length_of_Data' indicates a number of bytes of the power saving class. 'Sleep_Approved' indicates approval/non-approval of activation or deactivation of the power saving class. If a value of 'Sleep_Approved' is '1' and a value of 'Operation' is '1' (Activation), 'Start_frame_number' is included. If a value of 'Sleep_Approved' is '1' and a value of 'Definition' is '1', then 'Power_Saving_Class_Type', 'Direction', 'initial-sleep window', 'listening window', 'final-sleep window base', 'final-sleep window exponent', 'MOB_TRF-IND required', 'TTWF', and the like, are included. 'MOB_TRF-IND required' is applied only to the Power_Saving_Class_Type 1 and indicates that the BS should transmit at least one MOB_TRF-IND message to the MS in every listening window.

The MOB_TRF-IND message is transmitted from the BS to the MS during the listening window, and is used to indicate whether the BS has data to transmit to the MS. The MOB_TRF-IND message, unlike the MOB_SLP-REQ message and the MOB_SLP-RSP message, is transmitted in a broadcasting or multicasting manner. An example of a format of the MOB_TRF-IND message is shown in Table 3 below.

TABLE 3

| Syntax | Size (bits) | Notes |
|---|---|---|
| MOB_TRF-IND_Message_format ( ) { | | |
|   Management message type=52 | 8 | |
|   FMT | 1 | |
|   if (FMT==0) { | | |
|     SLPID Group Indication bit-map | 32 | Nth bit of SLPID-Group indication bit-map [MSB corresponds to N = 0] is allocated to SLPID Group that includes MS with SLPID values from N * 32 to N * 32 + 31 Meaning of this bit 0: There is no traffic for all the 32 MS which belong to the SLPID-Group 1: There is traffic for at least one MS in SLPID-Group |
|     Traffic Indication Bitmap | variable | Traffic Indication bit map comprises the multiples of 32-bit long Traffic Indication unit. A Traffic Indication unit for 32 SLPIDs is added to MOB_TRF-IND message whenever its SLPID Group is set to 1 32 bits of Traffic Indication Unit (starting from MSB) are allocated to MS in the ascending order of their SLPID values; 0: Negative indication 1: Positive indication |
|   } else { | | |
|     Num_Pos | 8 | Number of CIDs following |
|   For (i=0; i<Num_Pos; i++) { | | |
|     SLPIDs | 10 | |
|     } | | |
|   } | | |
|   Padding | variable | If needed, for alignment to byte boundary. |
|   TLV encoded items | Variable | |
| } | | |

As shown in Table 3, the MOB_TRF-IND message is used to indicate whether the BS has data to transmit to the MS. The MS receives the MOB_TRF-IND message during the listening window, and decides whether to transition from the sleep mode to the awake mode, or to continuously maintain the sleep mode.

When transitioning to the awake mode, the MS verifies frame synchronization. If the frame sequence number that the MS expected is not correct, the MS may request retransmission of missing data in the awake mode. However, the MS continuously maintains the sleep mode when the MS has failed to receive the MOB_TRF-IND message during the listening window, or when the MOB_TRF-IND message, though it has been received, has a negative indication indicating absence of data that the MS will receive.

The MOB_TRF-IND message may include at least one of the multiple IEs described below.

'Management Message Type' is information indicating a type of the message being transmitted, and Management Message Type=52 denotes that the message is a MOB_TRF-IND message. 'FMT' indicates whether the MOB_TRF-IND message will use a SLeeP IDentifier (SLPID) bitmap format or use a SLPID format.

A DL Sleep Control Extended Subheader is transmitted from the BS to the MS to activate or deactivate the power saving class. An exemplary format of the DL Sleep Control Extended Subheader is shown in Table 4 below.

TABLE 4

| Name | Size (bits) | Description |
|---|---|---|
| Power_Saving_Class_ID | 6 | Power Saving Class ID this command refers to. |
| Operation | 1 | 1 = activate Power Saving Class 0 = de-activate Power Saving Class |
| Final_Sleep_Window_Exponent | 3 | For Power Saving Class Type III only: assigned factor by which the final-sleep window base is multiplied in order to calculate the duration of single sleep window requested by the message. |
| Final_Sleep_Window_Base | 10 | For Power Saving Class Type III only: the base for duration of single sleep window requested by the message. |
| Reserved | 4 | |

The IEs that may be included in the DL Sleep Control Extended Subheader have been described above. Therefore, a detailed description thereof will be omitted.

With reference to FIGS. 2 to 5, a description will be made below of the sleep mode operation control method according to an exemplary embodiment of the present invention.

Figure 2:
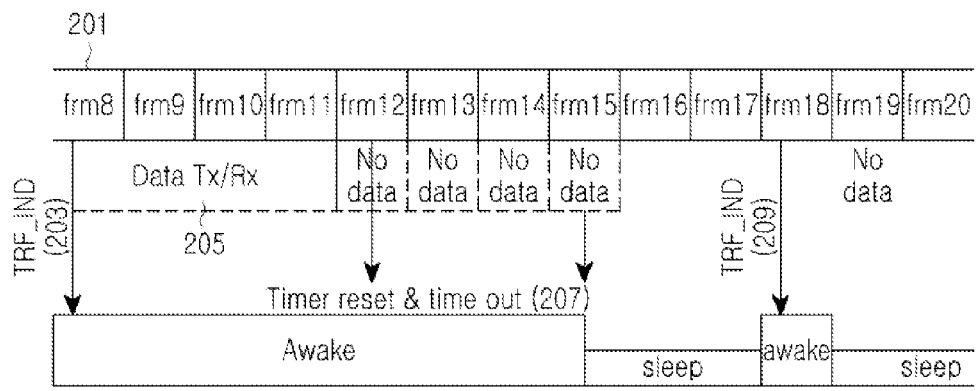
FIG. 2 is a diagram illustrating a Base Station (BS) operation for transmitting data in a communication system according to an exemplary embodiment of the present invention.

FIG. 2 is a diagram illustrating a BS operation for transmitting data in a communication system according to an exemplary embodiment of the present invention.

Referring to FIG. 2, the BS and an MS determine a sleep mode enter time, length of the sleep window and length of a listening window by exchanging an MOB_SLP-REQ message and an MOB_SLP-RSP message for mode transition to the sleep mode, and the MS enters the sleep mode at the determined time. The sleep mode entering operation is equivalent to the conventional operation. Therefore, a detailed description thereof will be omitted herein.

In FIG. 2, a length of the sleep window is determined as eight (8) frames and a length of the listening window as two (2) frames through transmission/reception of the MOB_SLP-REQ message and the MOB_SLP-RSP message between the MS and the BS. The BS recognizes that the MS is in the sleep window of the sleep mode over unshown frames #0 to #7. Upon entering frame #8 (201), the BS recognizes start of the listening window and transmits a MOB_TRF-IND message with an ID of the MS in frame #8 to inform the MS of the presence of data to transmit (203). The BS transmits the data to the MS after transmitting the MOB_TRF-IND message (205). After recognizing the MOB_TRF-IND message, the MS transmits the data to the BS during the listening window if there is data to transmit to the BS (205).

The MS starts a timer T1 if there is no more data to transmit and receive to/from the BS. The timer T1 is used to recognize that the MS has no data to receive from the BS and no data to transmit to the BS. The timer T1 may also be used to perceive that the MS has no data to receive from the BS but has data to transmit to the BS. Also, the timer T1 may be used to perceive that the MS has data to receive from the BS but has no data to transmit to the BS. Therefore, the timer T1 is restarted with 0 when data transmission/reception of the BS and the MS is triggered. Thereafter, if the BS completes its data transmission to the MS or data reception from the MS to the BS is completed in frame #11, there is no more data in frame #12, which is to be transmitted from the BS to the MS and to be received from the MS to the BS. Therefore, the MS increases the timer T1 for entering the sleep state, by one in every frame beginning from frame #12. If a threshold of the timer T1 is determined as four (4) frames, the timer T1 increases one by one from frame #12 through frame #15.

If the BS has no data to transmit and receive to/from the MS until the timer T1 arrives at its threshold of four (4), the timer T1 expires (207) and the MS enters the sleep mode in frame #16. That is, the MS operates in the sleep mode beginning from the frame (i.e., frame #16) right next to the frame where a value of the timer T1 arrived at its threshold. The BS may also have its own timer T1 that operates in the MS, so the BS may determine whether the MS operates in the sleep mode or the awake mode.

The next data transmission/reception is performed in the next listening window. An operation in the next listening window is similar to the listening window operation described above. Therefore, a description thereof will be omitted herein. As illustrated, the MS continuously maintains the sleep mode if a TRF-IND message with a negative indication is received in the next listening window or frame #18 (209).

Figure 3:
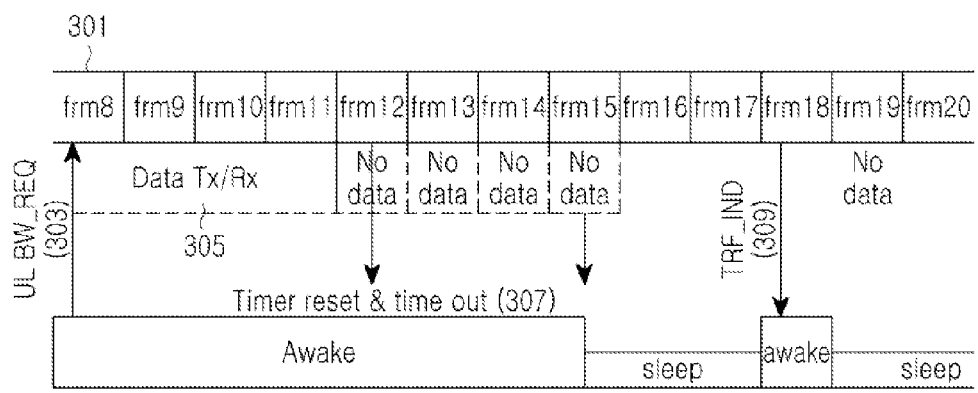
FIG. 3 is a diagram illustrating a Mobile Station (MS) operation for transmitting data in a communication system according to an exemplary embodiment of the present invention.

FIG. 3 is a diagram illustrating an MS operation for transmitting data in a communication system according to an exemplary embodiment of the present invention.

Referring to FIG. 3, a BS and the MS determine a sleep mode enter time, length of a sleep window and length of a listening window by exchanging an MOB_SLP-REQ message and an MOB_SLP-RSP message for mode transition to the sleep mode, and the MS enters the sleep mode at the determined time. The sleep mode entering operation is equivalent to a conventional operation. Therefore, a detailed description thereof will be omitted.

In FIG. 3, a length of the sleep window is determined as eight (8) frames and a length of the listening window as two (2) frames through transmission/reception of the MOB_SLP-REQ message and the MOB_SLP-RSP message between the MS and the BS. The MS enters the sleep mode, recognizing that a period of unshown frames #0 to #7 is the sleep window of the sleep mode. Upon entering frame #8 (301), the MS awakes from the sleep, recognizing the start of the listening window, and transmits an UpLink BandWidth REQuest (UL BW-REQ) message to the BS in frame #8 (303).

The MS transmits data to the BS (305). Also, if there is data to be received from the BS in the listening window, the data is received at the MS in the listening window (305). The MS resets a timer T1 to 0 and then starts the timer T1, right after completing the data transmission/reception.

The timer T1 is used to recognize that the MS has no data to receive and transmit from/to the BS. The timer T1 may also be used to perceive that the MS has no data to receive from the BS but has data to transmit to the BS. Also, the timer T1 may be used to perceive that the MS has data to receive from the BS, but has no data to transmit to the BS. Therefore, the timer T1 is restarted with 0 when data transmission/reception of the BS and the MS is triggered.

If the data transmission from the MS to the BS or the data reception from the BS to the MS is completed in frame #11, there is no data to be transmitted and received to/from the BS in frame #12. Therefore, the MS increases the timer T1 for entering the sleep state, by one in every frame beginning from frame #12. If a threshold of the timer T1 is determined as 4 frames, the timer T1 increases one by one from frame #12 through frame #15.

If the MS has no data to transmit and receive to/from the BS until the timer T1 arrives at its threshold of 4, the timer T1 expires (307) and the MS enters the sleep mode in frame #16. The next data transmission/reception is performed in the next listening window. An operation in the next listening window is similar to the listening window operation described above. Therefore, a description thereof will be omitted herein. As illustrated, the MS continuously maintains the sleep mode if a TRF-IND message with a negative indication is received in the next listening window or frame #18 (309).

Figure 4:
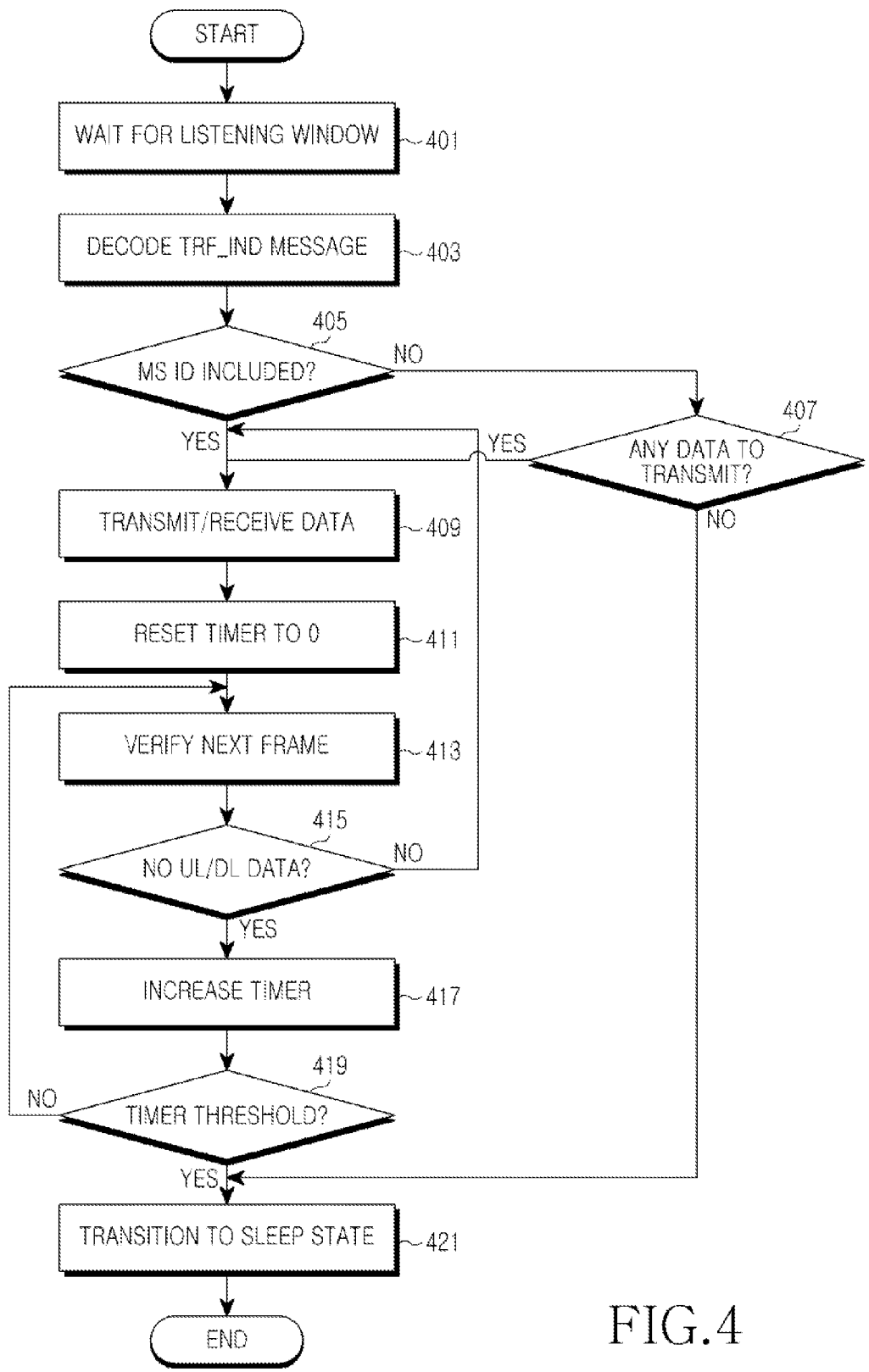
FIG. 4 is a diagram illustrating a sleep mode-related operation of an MS in a communication system according to an exemplary embodiment of the present invention.

FIG. 4 is a diagram illustrating a sleep mode-related operation of an MS in a communication system according to an exemplary embodiment of the present invention.

Referring to FIG. 4, in step 401, the MS remaining in a sleep window of the sleep mode enters a listening window and monitors whether data is received from a BS. Upon entering the listening window, the MS receives a MOB_TRF-IND message from the BS and decodes the MOB_TRF-IND message in step 403. In step 405, the MS determines whether an ID of the MS is included in the MOB_TRF-IND message. If the ID of the MS is included, the MS proceeds to step 409, and if the ID of the MS is not included, the MS proceeds to step 407. In step 409, the MS enters an awake state and receives data from the BS. In step 407, the MS verifies if there is data to transmit to the BS in an uplink buffer. If there is data to transmit, the MS proceeds to step 409. In step 409, the MS transmits the data to the BS.

In step 411, the MS resets a timer T1 to 0 and restarts the timer T1, right after the data transmission/reception between the MS and the BS is completed. In step 413, the MS verifies whether there is data to transmit/receive in the next frame. If it is determined in step 415 that the MS has no data to transmit and receive to/from the BS because of the completed data transmission/reception between the MS and the BS, the MS increases the timer T1 by one in step 417. The MS determines in step 419 whether the timer T1 has arrived at a preset threshold. If the time T1 arrived at the preset threshold, the MS transitions to the sleep state in step 421 and ends the operation. However, if the MS has data to transmit or receive to/from the BS in step 415, the MS returns to step 409 to re-perform data transmission/reception. If the MS has no data to transmit to the BS in step 407, the MS immediately transitions to the sleep state in step 421 and ends the operation.

Figure 5:
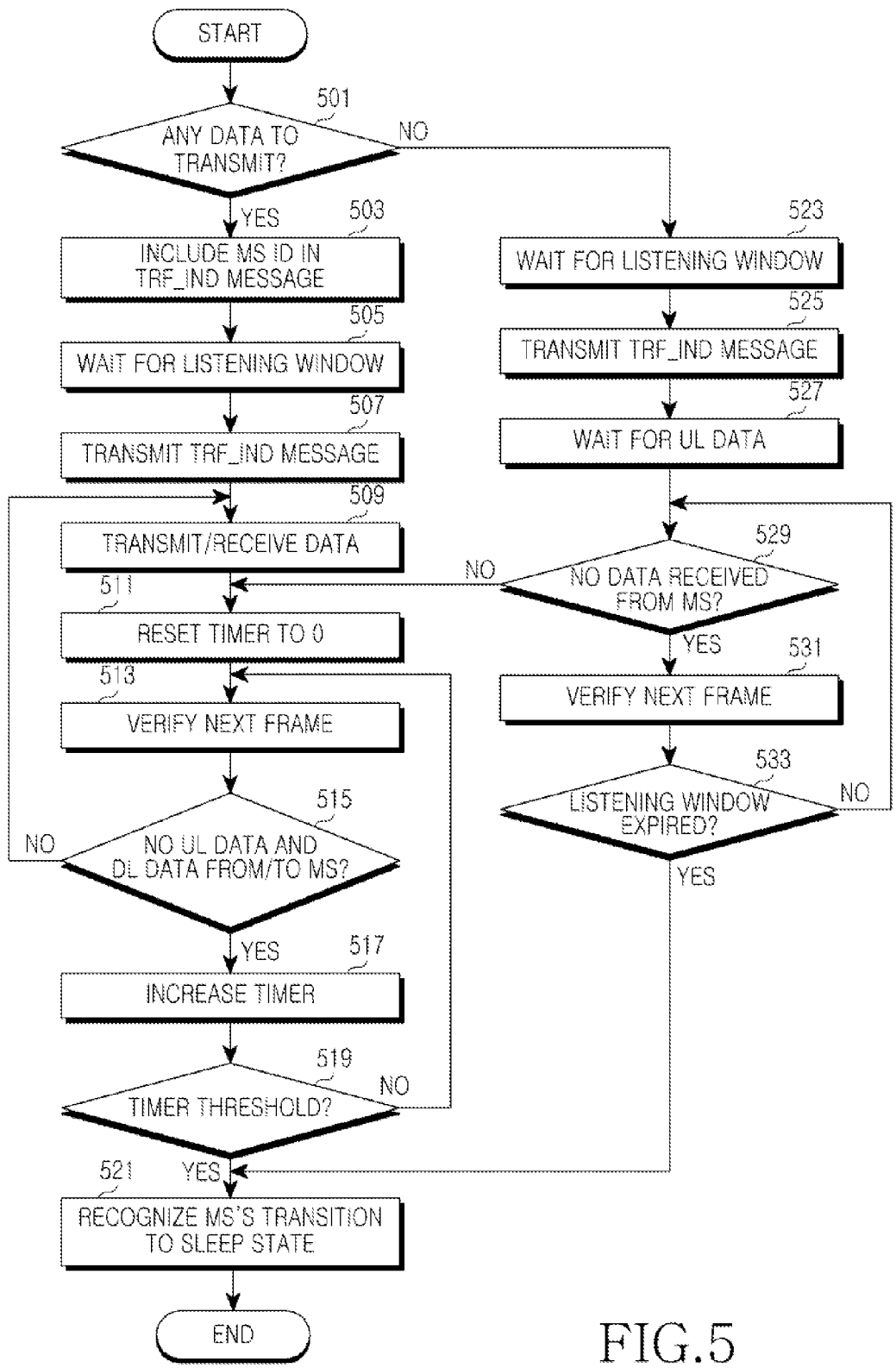
FIG. 5 is a diagram illustrating a sleep mode-related operation of a BS in a communication system according to an exemplary embodiment of the present invention.

FIG. 5 is a diagram illustrating a sleep mode-related operation of a BS in a communication system according to an exemplary embodiment of the present invention.

Referring to FIG. 5, the BS determines in step 501 whether it has data to transmit to an MS. If there is data to transmit to the MS, the BS proceeds to step 503. If there is no data to transmit, the BS proceeds to step 523. In step 503, the BS includes an ID of the MS in a MOB_TRF-IND message. The BS waits for a listening window in step 505, and if the listening window has arrived, the BS transmits a MOB_TRF-IND message to the MS in step 507. In step 509, the BS enters the awake state and transmits and receives data to/from the MS.

In step 511, the BS restarts a timer T1 upon completing its data transmission to the MS. In step 513, the BS verifies if there is data to transmit and receive in the next frame for data transmission/reception between the BS and the MS. If it is determined in step 515 that there is no data to transmit to the MS, the BS increases the timer T1 by 1 in step 517. The BS determines in step 519 whether the timer T1 has arrived at a preset threshold. If the timer T1 arrived at the preset threshold, the BS recognizes in step 521 that the MS transitions to the sleep state and ends the operation.

If it is determined in step 501 that there is no data to transmit to the MS, the BS waits for the listening window in step 523. If the listening window has arrived, the BS transmits a MOB_TRF-IND message with no ID of the MS in step 525. In step 527, the BS waits for UL traffic in the listening window and its succeeding listening window. If it is determined in step 529 that there is no data received from the MS, the BS verifies the next frame in step 531 to determine if there is data to transmit and receive. If it is determined in step 533 that the listening window has ended, the BS recognizes in step 521 that the MS has transitioned to a sleep state and ends the operation. However, if the listening window has not expired in step 533, the BS returns to step 529 to wait for UL traffic to be received from the MS.

If there is data received from the MS in step 529, the BS proceeds to step 511.

Although not illustrated, a description will also be made of a sleep mode operation control method that additionally uses a timer T2 and a timer T3.

When data transmission/reception first occurs, the BS and the MS determine a sleep mode enter time, length of a sleep window and length of the listening window by exchanging the MOB_SLP-REQ message and the MOB_SLP-RSP message for mode transition to the sleep mode. The MS enters the sleep mode according to the determined parameters. The sleep mode entering operation is equivalent to a conventional operation. Therefore, a detailed description thereof will be omitted herein. If the BS arrives at the listening window after entering the sleep mode, the BS transmits a MOB_TRF-IND message to the MS, and then transmits data to the MS. At this time, the timer T2 and the timer T3 operate. The timer T2 for DL is used to determine that the MS has no data to receive from the BS or the BS has no data to transmit to the MS. The timer T3 for UL is used to determine that the MS has no data to transmit to the BS or the BS has no data receive from the MS.

The timer T2 and the timer T3 are reset to 0 and then restarted as soon as the data transmission/reception is completed. If the MS has no data to receive from the BS or the BS has no data to transmit to the MS in every frame, the timer T2 increases one by one and operates until it reaches a preset threshold. Similarly, if the MS has no data to transmit to the BS or the BS has no data to receive from the MS in every frame, the timer T3 increases one by one and operates until it reaches a preset threshold. If data is not transmitted and/or received until the timer T2 and the timer T3 both arrive at their thresholds, the MS immediately transitions to the sleep state and stays in the sleep mode, and the BS recognizes the MS's mode transition to the sleep mode. The BS may also have timers T2 and T3 operating in the MS, so the BS may determine whether the MS operates in the sleep mode or the awake mode.

In an exemplary implementation, a description will be given of a method for applying the sleep mode operation control described above to Power_Saving_Class_Type 1 indicated by Traffic_Triggered_Wakening_Flag (TTWF) that is included in the MOB_SLP-REQ message and the MOB_SLP-RSP message and set to '0'.

The TTWF is used when the MS intends to maintain the sleep state even though data is generated in the listening window. In the sleep mode, the MS may selectively carry out an operation of performing data transmission/reception during a fixed listening window while repeating the sleep window and the listening window. The MS may also selectively carry out an operation of varying the listening window, i.e., an operation of continuously maintaining the listening window during occurrence of data transmission/reception. In the following description, the above described two operations will be called a "new sleep mode" operation.

An additional parameter is defined to control the new sleep mode operation. The parameter is added in a REGistration REQuest (REG-REQ) message and a REGistration ReSPonse (REG-RSP) message that the MS transmits and receives to/from the BS during network entry. The parameter is called a Variable Listening Interval Indicator (VLII). An example of the VLII is shown in Table 5.

TABLE 5

| Type | Length | Value | Scope |
|---|---|---|---|
| X | 1 | Support of new sleep mode with variable listening interval<br>0x00: Not Support (default)<br>0x01: Support | REG-REQ/RSP |

When the VLII is omitted in the REG-REQ message and the REG-RSP message, it is considered a default value of '0'. If the VLII is set to '0' in the above messages being transmitted, it indicates that the new sleep mode operation cannot be performed and the basic listening window has a fixed cycle. A VLII-based operation will be described in detail below.

A BS capable of supporting the new sleep mode operation verifies if the MS can perform the new sleep mode operation. If the MS cannot perform the new sleep mode operation, the BS transmits the REG-RSP message without the VLII parameter, or sets the VLII parameter to '0' and transmits it when transmission of the MOB_SLP-RSP message is needed.

If the MS can perform the new sleep mode operation, the MS verifies if the BS can support the new sleep mode operation. If the BS cannot support the new sleep mode operation, the MS transmits the RNG-REQ message without the VLII parameter, or sets the VLII parameter to '0' and transmits it when transmission of the MOB_SLP-REQ message is needed.

The VLII parameter may be transmitted/received using other messages except for the REG-REQ message and the REG-RSP message, for example, a Subscriber Station Basic Capability REQuest (SBC-REQ) message and a Subscriber Station Basic Capability ReSPonse (SBC-RSP) message.

For a new sleep mode operation of Power_Saving_Class_Type 1 with TTWF=0, the following modified messages are used.

The MOB_SLP-REQ message is transmitted to the BS when the MS staying in the awake mode intends to transition to the sleep state. An exemplary format of the MOB_SLP-REQ message is shown in Table 6 below.

TABLE 6

| Syntax | Size | Notes |
|---|---|---|
| MOB_SLP-REQ_Message_format ( ) | — | — |
| { | | |
|   Management message type=50 | 8 bits | — |
|   Number of Classes | 8 bits | Number of power saving classes |
|   for (i=0; i<Number_of_Classes; i++) | — | — |
|   { | | |
|     Definition | 1 bit | — |
|     Operation | 1 bit | |
|     Power_saving_Class_ID | 6 bits | |
|     if (Operation = = 1) | — | |
|       Start_frame_number | 7 bits | |
|       reserved | 1 bit | |
|     } | | |
|     if (Definition = 1) { | — | — |
|       Power_Saving_Class_Type | 2 | — |
|       Direction | 2 | |
|     TRF-IND required | 1 | |
|     Traffic_triggered_wakening_flag | 1 | |
|   Variable_Listening_Interval_Indicator | 1 | |
|     Reserved | 1 | |
|     initial-sleep window | 8 | |
|     listening window | 8 | |
|     final-sleep window base | 10 | |
|     final-sleep window exponent | 3 | |
|     Number_of_CIDs | 4 | |
|     for (i=0; i<Number_of_CIDs; i++) | | |
|     { | | |
|       CID | 16 | |
|     } | | |
|   } | | |
| } | | |
| TLV encoded information | variable | |
| } | | |

As shown in Table 6, the MOB_SLP-REQ message further includes a VLII parameter in addition to the IE fields in Table 1. The VLII parameter is applied only if the TTWF is set to '0'. That is, the VLII parameter is set to '0' if the MS cannot perform the new sleep mode and is also set to '0' even when the MS can perform the new sleep mode but the BS cannot support the new sleep mode.

The VLII parameter has two different meanings described below.

\* VLII=0 denotes that the MS operates in the basic sleep mode. That is, the listening window has a fixed length, and the MS and the BS perform data transmission/reception during the fixed listening window. If the listening window expires, the MS should transition to the sleep state and will operate in the next listening window.

\* VLII=1 denotes that the MS operates according to the examples illustrated in FIGS. 2 to 5. That is, the MS and the BS perform data transmission/reception during a variable listening window. In other words, the MS and BS transmit and receive data in the listening window, and if data to be transmitted and received exist continuously, the listening window is extended. If other data transmission/reception is not performed for a predetermined time after the data transmission/reception is completed, then the MS transitions back to the sleep state and operates in the next listening window.

The MOB_SLP-RSP message is transmitted to the MS by the BS to indicate whether to approve MS's mode transition to the sleep mode considering situations of the BS and the MS, or transmitted to the MS to indicate an unsolicited indication. In the MOB_SLP-RSP message, the parameters the MS requires to operate in the sleep mode are included in IEs. An exemplary format of the MOB_SLP-RSP message is shown in Table 7 below.

TABLE 7

| Syntax | Size | Notes |
|---|---|---|
| MOB_SLP-RSP_Message_format ( ) { | | — |
| Management message type=51 | 8 bits | — |
| Number of Classes | 8 bits | Number of power saving classes |
| for (i=0; i<Number_of_Classes; i++) { | — | — |
| Length of Data | 7 bits | |
| Sleep Approved | 1 bit | |
| Definition | 1 bit | — |
| Operation | 1 bit | |
| Power_Saving_Class_ID | 6 bits | — |
| if (Sleep Approved == 1) { | — | — |
| if (Operation = 1) { | | |
| Start_frame_number | 7 bits | |
| Stop_CQI_Allocation_Flag | 1 bits | |
| } | | |
| if (Definition = 1) { | — | — |
| initial sleep window | 8 | — |
| listening window | 8 | |
| final-sleep window base | 10 | |
| final-sleep window exponent | 3 | |
| Traffic_triggered_wakening_flag | 1 | |
| Power_Saving_Class_Type | 2 | |
| Direction | 2 | |
| TRF-IND_Required | 1 | |
| Variable Listening Interval Indicator | 1 | |
| Number_of_CIDs | 4 | |
| for (i=0; i<Number_of_CIDs; i++) { | — | |
| CID | 16 | |
| } | — | |
| If (TRF-IND required) { | | |
| SLPID | 10 | |
| Reserved | 2 | |
| } | | |

As shown in Table 7, the MOB_SLP-RSP message further includes a VLII parameter in addition to the IE fields in Table 2. The VLII parameter is applied when the TTWF is set to '0'. That is, the VLII parameter is used to indicate whether the BS can support the new sleep mode. If the BS cannot support the new sleep mode, the VLII parameter is set to '0'. The VLII parameter is also set to '0', when the BS can support the new sleep mode but the TTWF is set to '1'. If it is determined that the MS cannot perform the new sleep mode during its network entry, the VLII parameter is set to '0'. Even when it is recognized that the MS cannot support the new sleep mode during network entry, the VLII is set to '0' so that the MS may operate in the existing sleep mode.

When VLII=1 is set in the MOB_SLP-REQ message and the MOB_SLP-RSP message, the MS and the BS recognize that both the MS and the BS may operate in the new sleep mode.

The MS and the BS recognize an end point of the variable listening window and a transition point to the sleep state proposed in the new sleep mode operation using the timers described below.

(1) Timer_in_MS_for_New_SLM is managed by the MS. The timer in the MS increases by 1 in every frame beginning from the frame next to the frame where the listening window acquired by the MOB_SLP-REQ message and MOB_SLP-RSP message exchanged by the MS and the BS, i.e., a scheduled listening window expired. The timer is also restarted every time the MS receives data from the BS, thereby substantially extending the listening window. If there is no data to transmit and receive during the listening window, the MS transitions to the sleep state without restarting the timer. For example, if the MS has received a MOB_TRF-IND message and determined that an ID of the MS is not included in the MOB_TRF-IND message, the MS transitions to the sleep state. If the MS has no data to transmit to the BS until the timer arrives at a threshold, i.e., until the timer expires, the MS transitions to the sleep state in the listening window, and maintains the sleep state until the next listening window starts.

(2) Timer_in_BS_for_New_SLM is managed by the BS. The timer in the BS increases by 1 in every frame beginning from the frame next to the frame where the listening window acquired by the MOB_SLP-REQ message and the MOB_SLP-RSP message exchanged by the MS and the BS, i.e., a scheduled listening window expires. The timer is also restarted every time the BS receives data from the MS, thereby substantially extending the listening window. If data to be transmitted to the MS is not generated until the timer expires, the BS recognizes that the MS has transitioned to the sleep state. Even though data is generated, the BS buffers the generated data without transmission until the MS awakes in the next listening window.

A count unit of the above timers may be time or frames. If the count unit of the timers is frames and their thresholds are 5 frames, the timers will normally expire when no data is received from the corresponding node over 5 frames.

In the case of TTWF=0 and VLII=1, in order to exit a power saving class, i.e., in order for the MS to exit the sleep mode, transmission/reception of the MOB_SLP-REQ message and the MOB_SLP-RSP message, and deactivation of BW and UL Sleep Control Header and DL Sleep Control Extended Subheader are used.

The MS transitions to the sleep state if the timer expires or there is no data to transmit or receive. However, if the MS intends to transition to the sleep state before expiration of the timer or the BS wants to instruct the MS to transition to the sleep state, the MS may transition to the sleep state by transmitting and receiving the MOB_SLP-REQ message and the MOB_SLP-RSP message.

The BS may also instruct the MS to transition to the sleep state, using a management message. In this case, the BS sets the management message as an unsolicited indication.

Several exceptions in an exemplary embodiment of the present invention will be described below.

1. BS Receive BW-REQ Message from MS During Sleep Window

The MS may transmit a BW-REQ message to the BS, if the MS should transmit data to the BS due to, for example, an occurrence of an emergency even though the MS is in the sleep state, if the MS needs Code Division Multiple Access (CDMA) code ranging although data to be transmitted was generated from the beginning of the listening window, or if the window required to receive a UL burst grant from the BS is longer than the listening window.

In response to the BW-REQ message, the BS decides whether to approve the data transmission of the MS. When the BS approved the data transmission of the MS, the BS starts the Timer_in_BS_for_New_SLM timer and then waits for data to be received from the MS. Likewise, when the BS approved the MS's data transmission, i.e., when the MS received the UL burst grant from the BS, the MS transmits data to the BS through UL bursts, starts the Timer_in_MS_for_New_SLM timer and then waits for data to be received from the BS.

If the MS is in the sleep state, the BW-REQ message may be transmitted immediately or in the next listening window based on the MS's intent or selection, as described above.

2. MS Fail to Receive DL-MAP or UL-MAP which is Normal MAP Information

Upon arriving at the listening window, the MS starts the Timer_in_MS_for_New_SLM timer and waits for data to be received from the BS. The BS transmits a normal MAP (DL-MAP/UL-MAP) to the MS and then transmits data.

If there is data to be transmitted and received between the BS and the MS at the end of the listening window, the MS may transmit and receive data to/from the BS by extending the listening window. However, the MS may fail to receive the normal MAP during the Extended Listening Window (ELW). In this case, the MS cannot determine whether the BS has transmitted data to the MS. Accordingly, the MS may transition to the sleep state and determines that the BS has no data to transmit.

In this case, the MS extends the listening window by restarting or temporarily pausing the Timer_in_MS_for_New_SLM timer, before it transitions to the sleep state. The MS may extend the listening window by restarting the Timer_in_MS_for_New_SLM timer if the MS cannot receive the DL-MAP out of the normal MAP from the BS.

3. MS Fail to Receive SUB-DL/UL-MAP

The BS transmits a maximum of three (3) SUB-DL-UL-MAPs using a compressed MAP instead of the normal MAP. That is, the BS may apply different Modulation and Coding Scheme (MCS) levels to the maximum of 3 SUB-DL-UL-MAPs. The MS may decode any one or all of the maximum of 3 SUB-DL-UL-MAPs based on channel conditions. If the MS failed to receive or decode all the SUB-DL-UL-MAPs transmitted by the BS during the listening window, the MS extends the listening window by restarting the Timer_in_MS_for_New_SLM timer.

In other words, if the MS cannot decode the compressed MAP, it cannot also decode the SUB-DL/UL-MAPs. Therefore, the MS extends the listening window by restarting the timer Timer_in_MS_for_New_SLM, even when it failed to decode the compressed MAP transmitted by the BS.

4. No ACK is Received from MS in Response to Data Transmitted by BS

The BS transmits data to the MS and then waits for a feedback message from the MS by starting the Timer_in_BS_for_New_SLM timer in a communication system to which Automatic Repeat reQuest (ARQ) is applied. The MS determines whether the data transmitted by the BS has been received normally or abnormally, and may transmit an ACK or NACK message to the BS based on the determination. However, the MS may fail to transmit the ACK or NACK message to the BS because of the poor channel condition or the lack of the MS battery. Thus, the BS fails to receive the ACK or NACK message indicating the normal or abnormal reception of the data transmitted from the BS to the MS. In this case, the Timer_in_BS_for_New_SLM timer started by the BS expires.

Even though other data to be transmitted to the MS is generated, the BS stops the data transmission to the MS and resumes the data transmission in the next listening window, because the ACK or NACK message is not received from the MS. In other cases, the BS stops the data transmission to the MS even though Channel Quality Indication (CQI) information on a Channel Quality Indication Channel (CQICH) assigned to the MS by the BS is not transmitted to the BS a predetermined number of times. If the BS allocated UL resources for UL bursts to the MS but the MS does not transmit UL burst data with the allocated resources, then the BS delays the data transmission to the next listening window even if data to be transmitted to the MS is generated in the current listening window, considering that the MS is in an abnormal state.

In an alternative exemplary embodiment of the present invention, the VLII parameter is included in the MOB_SLP-REQ message and the MOB_SLP-RSP message in the form of an IE or RLV Encoding.

For example, the VLII parameter is included in a 'TLV encoded information' IE in the MOB_SLP-REQ message and the MOB_SLP-RSP message in the form shown in Table 8 below.

TABLE 8

| Type | Length | Value | Scope |
|---|---|---|---|
| X | 1 | Power Saving Class ID: 6 bits<br>Variable Listening Interval Indicator: 1 bit<br>Reserved: 1 bit (LSB) | SLP-REQ/RSP |

As shown in Table 8, 'TLV encoded information' includes a Power Saving Class ID and a VLII for the Power Saving Class ID.

In another exemplary embodiment of the present invention, a threshold of the Timer_in_MS_for_New_SLM timer may be signaled between the BS and the MS. That is, if the MS can perform the new sleep mode operation, the parameter shown in Table 9 below is included in the REG-REQ message together with the VLII parameter. For example, the following Timer_in_MS_for_New_SLM parameter has a form of TLV encoding.

TABLE 9

| Type | Length | Value | Scope |
|---|---|---|---|
| X | 1 | Timer_in_MS_for_New_SLM (unit: frame) | REG-REQ/RSP |

If the VLII is included in the REG-REQ message and the Timer_in_MS_for_New_SLM is not included, the BS considers that the MS requests a default value.

Upon determining that the MS requests a default value of the Timer_in_MS_for_New_SLM in the REG-REQ message transmitted by the MS, the BS includes a parameter shown in Table 10 in the REG-RSP message being transmitted in response to the REG-REQ message, together with the VLII parameter. For example, the following Timer_in_MS_for_New_SLM parameter has a form of TLV encoding.

TABLE 10

| Type | Length | Value | Scope |
|---|---|---|---|
| Y | 1 | Timer_in_MS_for_New_SLM (unit: frame) | REG-REQ/RSP |

The Timer_in_MS_for_New_SLM parameter includes the same value as the value that the MS requested using the MOB_SLP-REQ message, or includes a value allocated within an allowable range supported by the BS. A value of the Timer_in_MS_for_New_SLM parameter is set to be greater than the value of the Timer_in_BS_for_New_SLM timer managed by the BS.

If the BS transmits the MS the REG-RSP message that includes only the VLII and does not include the Timer_in_MS_for_New_SLM parameter, the MS determines to start the Timer_in_MS_for_New_SLM timer with a predetermined value.

The Timer_in_MS_for_New_SLM timer may be set differently according to the power saving class. That is, the Timer_in_MS_for_New_SLM timer may be set to a different value according to a data pattern, i.e., a connection, belonging to each power saving class. A parameter format for supporting the Timer_in_MS_for_New_SLM timer having a different value for each power saving class is shown in Table 11 below.

TABLE 11

| Type | Length | Value | Scope |
| --- | --- | --- | --- |
| Z | 2 | Power Saving Class ID: 6 bits<br>Variable Listening Interval Indicator: 1 bit<br>Timer_in_MS_for_New_SLM: 8 bits<br>Reserved: 1 bit (LSB) | SLP-REQ/<br>RSP |

When the MS and the BS can perform or support the new sleep mode, the parameters shown in Table 11 are included in the MOB_SLP-REQ message and the MOB_SLP-RSP message only for the power saving class with TTWF=0. In this case, the MS may request the value desired by the BS by setting the Timer_in_MS_for_New_SLM parameter to a default value.

In an alternative exemplary embodiment of the present invention, the VLII parameter may be included in the MOB_SLP-REQ message and the MOB LSP-RSP message not in the form of TLV encoding, but in the form of another parameter.

In this case, the Timer_in_MS_for_New_SLM timer may be transmitted in the form of TLV encoding shown in Table 12 below. That is, it is possible that the VLII parameter is transmitted in the IE form and the Timer_in_MS_for_New_SLM timer is transmitted in the TLV encoding form.

TABLE 12

| Type | Length | Value | Scope |
| --- | --- | --- | --- |
| K | 2 | Power Saving Class ID: 6 bits<br>Timer_in_MS_for_New_SLM: 8 bits<br>Reserved: 2 bits (LSB) | SLP-REQ/<br>RSP |

The BS may inform a value of the Timer_in_MS_for_New_SLM timer managed by the MS by including the 'TLV encoded information' of Table 12, for a power saving class with TTWF=0 and VLII=1.

An exemplary embodiment of the present invention described below is provided to resolve problems raised when the MS and the BS simultaneously request the sleep mode. That is, in order for the MS to distinguish the MOB_SLP-RSP message that was transmitted in an unsolicited manner by the BS, the following parameter is added in the MOB_SLP-RSP message in addition to the parameters shown in Table 2.

An unsolicited indication parameter is set to '1' when the BS transmits the MOB_SLP-RSP message to the MS in an unsolicited manner.

In an exemplary implementation, instead of Sleep_Approved as defined in Table 2, the parameter described below is included in the MOB_SLP-RSP message.

A Response_Code parameter indicates whether the MOB_SLP-RSP message is a certain response to the request of the MS, or whether it is transmitted in an unsolicited manner. In other words, Response_Code=0 denotes that the BS transmits the MOB_SLP-RSP message to the MS in an unsolicited manner, Response_Code=1 indicates an Approval for the MOB_SLP-REQ message transmitted by the MS, and Response_Code=2 indicates a Rejection for the MOB_SLP-REQ message transmitted by the MS.

Another unsolicited indication parameter other than the above-described parameter may be used to indicate that the MOB_SLP-RSP message is transmitted in an unsolicited manner. If it is recognized by the unsolicited indication parameter that the MS and the BS simultaneously requested the sleep mode, one of the following two operations may be performed according to system settings, selection of the system designer, definition in the standard, or other criteria.

When the request of the MS is prioritized, the BS responds to the MOB_SLP-REQ message of the MS, ignoring an unsolicited MOB_SLP-RSP message transmitted by the BS itself. The MS also waits for the BS to retransmit a proper MOB_SLP-RSP message in response to its MOB_SLP-REQ message, disregarding the unsolicited MOB_SLP-RSP message.

When the request of the BS is prioritized, the BS considers that the MS performs a sleep mode operation based on the MOB_SLP-RSP message of the BS, throwing up the MOB_SLP-REQ message transmitted by the MS itself. The MS operates based on the parameters in the unsolicited MOB_SLP-RSP message transmitted by the BS.

In an exemplary implementation, a condition to exit the variable listening window is independently defined in the BS and the MS. That is, starting conditions of the timers for extension of the listening window are described below.

In a Starting Condition of Timer_in_MS_for_New_SLM, the MS starts the timer at the end of the listening window, if it receives DL data from the BS during the listening window, or receives a positive indication through a MOB_TRF-IND message. However, the MS starts the timer, if it receives DL data from the BS during the listening window, receives signaling (e.g., a DL-MAP IE informing the MS of the transmission of DL data, which is included in a DL-MAP message indicating DL resource allocation of each frame) informing the MS of the transmission of DL data, or receives a positive indication through the MOB_TRF-IND message.

The reason for using the signaling informing the transmission of DL data instead of receiving the actual DL data is to prepare for when the MS fails to decode a DL burst with DL data from the frame despite receiving a DL-MAP informing the transmission of DL data. For example, in the case where the BS allocated resources for DL bursts to the MS through the DL-MAP, if the BS retransmits the DL burst according to a Hybrid Automatic Repeat reQuest (HARQ) operation even though the MS fails to decode the DL burst, the MS waits for retransmission of the DL burst based on the signaling without entering the sleep state.

The condition on which the timer is restarted is the condition as described above. In addition, the timer is restarted even when ARQ ACK or HARQ ACK is received in reply to UL traffic. If NACK-based ARQ is used, ARQ NACK, not ARQ ACK, is used to restart the timer. If NACK-based HARQ is used, HARQ NACK is used to restart the timer. The MS also restarts the timer upon receiving signaling (e.g., resource allocation information informing the MS of the transmission of DL data, which is included in a DL-MAP message) informing the MS of the transmission of DL data. Therefore, the MS does not enter the sleep state based on the signaling even though it fails to decode the DL burst indicated by the DL-MAP IE.

As a result, the listening window is extended when the MS can know that the BS is normally operating.

In a Starting Condition of Timer_in_BS_for_New_SLM, the BS starts the timer at the end of the listening window, if it receives UL data from the MS during the listening window.

However, in an exemplary implementation, the BS immediately starts the timer, if it receives UL data from the MS during the listening window.

The condition on which the timer is restarted is similar to the condition described above. In addition, the timer is restarted even when ARQ ACK or HARQ ACK is received in reply to DL traffic. If NACK-based ARQ is used, ARQ NACK, not ARQ ACK, is used to restart the timer. If NACK-based HARQ is used, HARQ NACK is used to restart the timer. As a result, the listening window is extended when the BS knows that the MS is normally operating.

Figure 6:
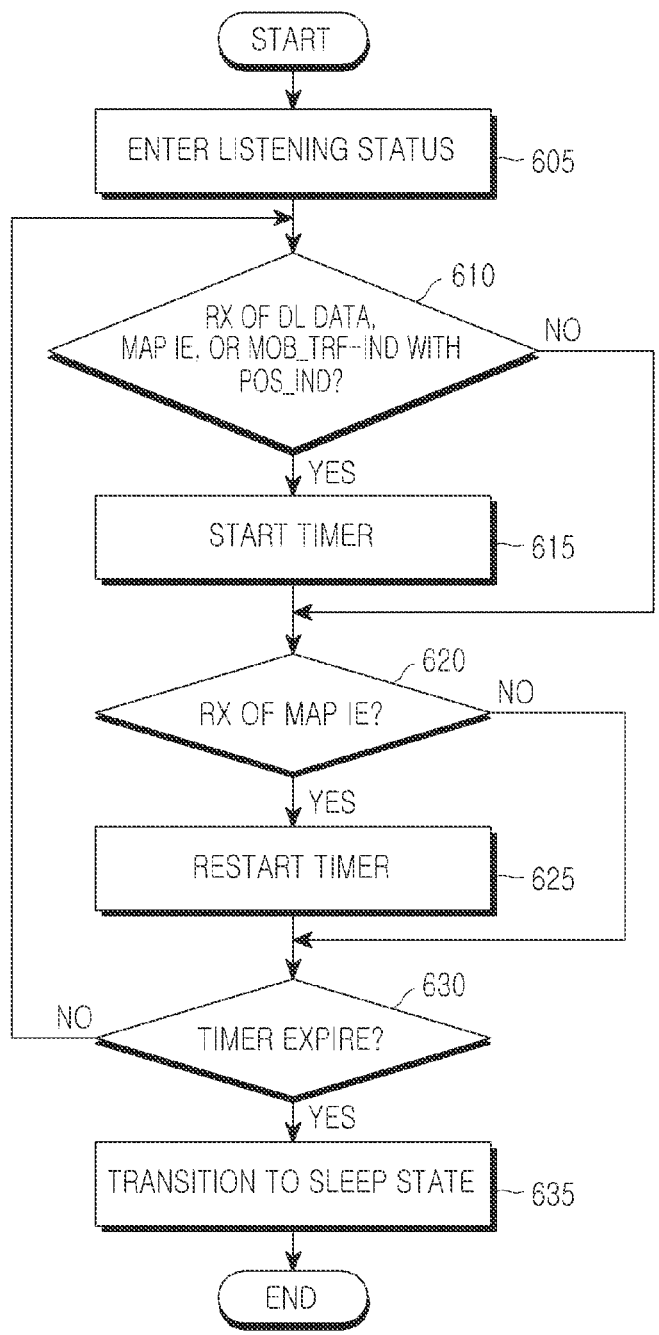
FIG. 6 is a diagram illustrating a sleep mode-related operation of an MS in a communication system according to another exemplary embodiment of the present invention.

FIG. 6 is a diagram showing illustrating a sleep mode-related operation of an MS in a communication system according to another exemplary embodiment of the present invention.

Referring to FIG. 6, in step 605, the MS enters a listening status. During a listening window corresponding to the listening status, in the step 610, the MS checks whether the MS receives DL data from the BS, receives signaling (e.g., a DL-MAP IE informing the MS of the transmission of DL data, which is included in a DL-MAP message indicating DL resource allocation of each frame) informing the MS of the transmission of DL data, or receives a MOB_TRF-IND message with a positive indication (POS_IND). If the MS receives the DL data from the BS, receives the signaling, or receives the MOB_TRF-IND message with POS_IND, the MS proceeds to step 615. If not, the MS proceeds to step 620. In step 615, the MS starts the timer T1 for remaining the listening window, and the MS remains the listening window.

In step 620, the MS checks whether the MS receives signaling (e.g., resource allocation information informing the MS of the transmission of DL data, which is included in a DL-MAP message) informing the MS of the transmission of DL data. If the signaling is received, the MS proceeds to step 625. If not, the MS proceeds to step 630. In step 625, the MS restarts the timer T1 to expand to the listening window. In step 630, the listening window maintains until the timer expires. If the timer expires in step 630, the MS transitions to the sleep state in step 635.

In a modified exemplary embodiment of the present invention described below, for the timers for extension of the listening window, transition conditions to the sleep state are described below.

In a Transition Condition to Sleep State by Timer_in_MS_for_New_SLM, the MS transitions to the sleep state, if there is no data to transmit to the BS when the Timer_in_MS_for_New_SLM timer expires. In this case, however, if UL traffic continuously exits in the MS, the MS is always awake, increasing MS's battery consumption. Therefore, in an exemplary implementation, the MS transitions to the sleep state if the timer expires and the HARQ retransmission retries or ARQ retransmission retries are exhausted. Hence, the presence/absence of UL traffic to be transmitted by the MS does not affect the MS's transition to the sleep state. That is, if the retransmission retries are exhausted, the MS transitions to the sleep state, and determines that the MS cannot normally receive ACK from the BS and there is no DL traffic. If the retransmission retries have reached a predetermined limit, the MS determines that the retransmission retries have been exhausted.

In a Transition Condition to Sleep State by Timer_in_BS_for_New_SLM, the BS waits until the HARQ or ARQ retransmission retries are exhausted, when the Timer_in_BS_for_New_SLM timer expires. Thereafter, if the HARQ or ARQ retransmission retries are exhausted, the BS considers that the MS has transitioned to the sleep state. Likewise, the presence/absence of DL traffic to be transmitted to the MS by the BS does not affect the MS's transition to the sleep state.

In an alternative exemplary embodiment of the present invention, starting conditions of timers for extension of the listening window are described below.

The MS immediately starts the Timer_in_MS_for_New_SLM timer, upon receiving DL data or ACK (HARQ ACK or ARQ ACK) for UL data from the BS during the listening window. The BS immediately starts the Timer_in_BS_for_New_SLM timer upon receiving UL data or ACK for DL data from the MS during the listening window.

In an alternative exemplary embodiment of the present invention, starting conditions of timers for extension of the listening window are described below.

The MS immediately starts the Timer_in_MS_for_New_SLM timer, when it receives DL data or ACK (HARQ ACK or ARQ ACK) for UL data from the BS during the listening window, or when, after transmitting a BW-REQ message to the BS, the MS is allocated a UL burst as a Grant thereto. The BS immediately starts the Timer_in_BS_for_New_SLM timer, if it receives UL data or ACK (HARQ ACK or ARQ ACK) for DL traffic from the MS during the listening window, or if, after receiving a BW-REQ message from the MS, the BS allocates a UL burst to the MS as a Grant thereto.

In addition to the aforementioned starting conditions for timers for extension of the listening window, the MS additionally considers the case where it has received a positive indication from the BS through a MOB_TRF-IND message. That is, the MS immediately starts the Timer_in_MS_for_New_SLM timer upon receiving a positive indication from the BS through a MOB_TRF-IND message.

In an alternative exemplary embodiment of the present invention, if the BS does not transmit a MOB_TRF-IND message when there is no DL traffic to transmit to MSs to which the BS is expected to transmit the MOB_TRF-IND message during the listening window, then the BS includes the following field in a DL-MAP message to inform the MSs of the non-transmission of the DL-MAP message.

In a Transmission of MOB_TRF-IND when this field is set to '0', it denotes that the BS does not transmit the MOB_TRF-IND message, i.e., the BS has no DL traffic for the MSs that are awake during the listening window and waiting for the MOB_TRF-IND message. Upon recognizing this field, the MSs immediately transition to the sleep state regardless of the length of the remaining listening window based on the circumstances, for example, if there is no UL traffic, and then awake again in the next listening window. If the above field is set to '1', the MSs wait for the MOB_TRF-IND message as described in the conventional operation.

The field may be transmitted in the form of TLV encoding in the DL-MAP, or in the form of a 1-bit indicator inserted in the superframe header.

Upon waking up from the sleep mode, the MS needs to verify the frame number in order to determine whether it has woken up in the exact frame. When the superframe is used and one superframe includes multiple frames, a frame number or a superframe number is verified only from a superframe header located in the first frame of the superframe. However, when the sleep mode operation is carried frame by frame, the MS may not immediately receive the superframe header, so it cannot know the frame number. Therefore, when the superframe structure is used, the sleep mode operation should be performed on a superframe-by-superframe basis. That is, the listening window should be located from the first frame of the superframe. However, the length of the listening window should not necessarily increase in multiples of the superframe.

Accordingly, 'start frame number' in the MOB_SLP-REQ/RSP message, which indicates a position of the frame where the sleep window starts, is set to indicate the first frame of the superframe. For example, six (6) Least Significant Bit (LSB) bits of a superframe number provided to identify the superframe, or 6 LSB bits of a frame number provided to identify the first frame of the superframe are set in the 'start frame number'.

A step size of the sleep window is determined by [superframe length×N], where the superframe length denotes the number of frames included in one superframe, e.g., four (4) frames. Therefore, N or 4×N is included in the "initial-sleep window" field or other field of the MOB_SLP-REQ/RSP message to indicate the length of the sleep window.

When a combination of one sleep window and one listening window is called a sleep cycle in the sleep mode, the listening window is included in every sleep cycle. Therefore, if a start position of the sleep window, or the beginning of the sleep cycle is designated as the first frame of the superframe and the unit length of the sleep window is designated as a multiple of the superframe length, even though the length of the sleep window is doubled, the listening window will always be located in the first frame of any superframe. Thus, upon waking up in the listening window, the MS may refer to the frame number to determine whether it has woken up at the correct time.

According to the new sleep mode operation, the listening window is extended by the timers running in the BS and MS when data or ACK is continuously received. The extended listening window may eventually reach the next-scheduled listening window, which denotes that the timers of both the BS and the MS are continuously reset due to the data and/or ACK. The MS and the BS then apply the new sleep mode operation again in the next-scheduled listening window and determines that the extended listening window has expired. The next-scheduled listening window may be a new extended listening window according to the results of the application. The 'scheduled listening window' as used herein refers to the listening window originally determined by the parameters indicated by the MOB_SLP-REQ/RSP message.

Especially at the beginning of the sleep mode operation, since the length of the sleep window is short, the extended listening window is likely to reach the next-scheduled listening window. If the extended listening window expires and the newly started listening window is extended again in a consecutively repeated way, i.e., if the extended listening window continuously occurs several times, the MS continuously maintaining the sleep mode is meaningless.

Therefore, in an exemplary embodiment of the present invention described below, a threshold is used to verify the number of consecutive extended listening windows. The MS determines whether the number of the consecutive extended listening windows has reached the threshold, if the listening window extended according to the proposed new sleep mode operation has reached the next-scheduled listening window. The new extended listening window is included to count the number of consecutive extended listening windows, or is omitted. If the number of consecutive extended listening windows is less than the threshold, the MS maintains the sleep mode. However, if the number of consecutive extended listening windows has reached the threshold, the MS transitions from the sleep mode to the normal mode, considering that there is no longer a need to maintain the sleep mode. Using the same algorithm as that of the MS, the BS also perceives whether the MS maintains the sleep mode or transitions to the normal mode.

If the MS reaches the next-scheduled listening window without transitioning to the normal mode, the timers used for extension of the listening window are stopped and then restarted. For example, if data is exchanged during expiration of the timers, the timers for extension of the listening window are restarted by the conditions described above.

An exemplary sleep cycle includes a listening window and a sleep window. However, the listening window is not included in an initial sleep cycle, and the sleep cycle is a sum of the listening window and the sleep window, starting from the second sleep cycle. If data traffic is not exchanged between the MS and the BS during the listening window included in the previous sleep cycle and if a negative indication is included in the TRF-IND message, a length of the current sleep cycle is doubled from the previous length. However, the length of the current sleep cycle cannot exceed a predetermined maximum sleep cycle. Although the current sleep cycle is doubled, the listening window in the current sleep cycle is not doubled.

If data is exchanged in the listening window of the previous sleep cycle or a positive indication is included in the TRF-IND message, then the current sleep cycle is initialized to the initial sleep cycle. However, if a length of the initialized current sleep cycle is shorter than the listening window, the current sleep cycle cannot include the listening window. Hence, the conditions described below are additionally considered, when each sleep cycle is reset.

Current Sleep Cycle=Initial Sleep Cycle
If 'Current Sleep Cycle'=<Listening Window
  Current Sleep Cycle=2×Initial Sleep Cycle
Else
  Current Sleep Cycle=Current Sleep Cycle That is, if the current sleep cycle is greater than the listening window, the sleep cycle is maintained at the existing value.

The foregoing exemplary embodiments of the present invention may be implemented by controllers and transceivers included in a BS and an MS. That is, the controller determines whether to extend a listening window of the MS by operating a timer according to at least one of the exemplary embodiments of the present invention described above, and the transceiver operates in the listening window or a sleep window under the control of the controller, and exchanges the above-described messages with a corresponding node.

Accordingly, exemplary embodiments of the present invention provide a method for controlling a sleep mode operation for reduction of power consumption in a communication system. The sleep mode operation between the MS and the BS is controlled by operating the timers, thereby reducing power consumption.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling a sleep mode by a Mobile Station (MS) the method comprising:
  starting a timer for a listening window corresponding to a listening state if the MS receives first resource allocation information indicating a first resource for data communication to the MS by a Base Station (BS);

communicating first data with the BS on the first resource indicated by the first resource allocation information;
restarting the timer in order to extend the listening window, if the MS receives second resource allocation information indicating a second resource for data communication to the MS by the BS;
maintaining the listening state by extending the listening window until the timer expires;
communicating second data with the BS on the second resource indicated by the second resource allocation information; and
transitioning to a sleep state if the timer expires,
wherein the MS operates a sleep cycle comprising the listening window and a sleep window corresponding to the sleep state, and
wherein a length of the sleep cycle is changed to double a length of a previous sleep cycle, if there is no data traffic between the MS and the BS during a previous listening window included in the previous sleep cycle or if a negative indication is included in traffic indication information received from the BS, and
wherein a length of the listening window included in the sleep cycle is the same as the previous listening window.

2. The method of claim 1, further comprising transmitting to the BS a first message comprising a first parameter indicating a default length of the listening window and a second parameter indicating extensibility of the listening window.

3. The method of claim 1, further comprising receiving from the BS a second message comprising a first parameter indicating a default length of the listening window and a second parameter indicating extensibility of the listening window.

4. The method of claim 3, wherein the second message further comprises a third parameter indicating whether the second message is transmitted in response to a first message transmitted by the MS or transmitted in an unsolicited manner.

5. The method of claim 1, further comprising:
starting the timer if the MS receive first indication information indicating whether there is data which the BS transmits to the MS by including an identifier of the MS in the first indication information.

6. The method of claim 1, further comprising:
waiting for retransmission of the data based on the first signaling information without entering the sleep state if the MS fails to decode the data.

7. A method for controlling a communication of a Mobile Station (MS) by a Base Station (BS), the method comprising:
starting a timer for a listening window corresponding to a listening state if the BS transmits first resource allocation information indicating a first resource for data communication to the MS;
communicating first data with the MS on the first resource indicated by the first resource allocation information;
restarting the timer in order to extend the listening window, if the BS transmits second resource allocation information indicating a second resource for data communication to the MS;
determining that the MS is maintaining the listening state by extending the listening window until the timer expires;
communicating second data with the MS on the second resource indicated by the second resource allocation information; and
determining that the MS has transitioned to a sleep state, if the timer expires,
wherein the MS operates a sleep cycle comprising the listening window and a sleep window corresponding to the sleep state, and
wherein a length of the sleep cycle is changed to double a length of a previous sleep cycle, if there is no data traffic between the MS and the BS during a previous listening window included in the previous sleep cycle or if a negative indication is included in traffic indication information transmitted to the MS, and
wherein a length of a listening window included in the sleep cycle is the same as the previous listening window.

8. The method of claim 7, further comprising receiving from the MS a first message comprising a first parameter indicating a default length of the listening window and a second parameter indicating extensibility of the listening window.

9. The method of claim 7, further comprising transmitting the MS a second message comprising a first parameter indicating a default length of the listening window and a second parameter indicating extensibility of the listening window.

10. The method of claim 9, wherein the second message further comprises a third parameter indicating whether the second message is transmitted in response to a first message received from the MS or transmitted in an unsolicited manner.

11. The method of claim 7, further comprising:
starting the timer if the BS transmits first indication information indicating whether there is data which the BS transmits to the MS by including an identifier of the MS in the first indication information.

12. The method of claim 7, further comprising:
determining that the MS waits for retransmission of the data based on the first signaling information without entering the sleep state if the MS fails to decode the data.

13. A Mobile Station (MS) apparatus comprising:
a controlling configured to:
start a timer for a listening window corresponding to a listening state if the MS receives first resource allocation information indicating a first resource for data communication to the MS by a Base Station (BS), and
restart the timer in order to extend the listening window if the MS receives second resource allocation information indicating a second resource for data communication to the MS by the BS; and
a transceiver configured to:
communicate first data with the BS on the first resource indicated by the first resource allocation information,
maintain the listening state by extending the listening window until the timer expires,
communicate second data with the BS on the second resource indicated by the second resource allocation information, and
transition to a sleep state if the timer expires,
wherein the controller operates a sleep cycle comprising the listening window and a sleep window corresponding to the sleep state, and
wherein a length of the sleep cycle is changed to double a length of a previous sleep cycle, if there is no data traffic between the MS and the BS during a previous listening window included in the previous sleep cycle or if a negative indication is included in traffic indication information received from the BS, and
wherein a length of a listening window included in the sleep cycle is same to the previous listening window.

14. The MS apparatus of claim 13, wherein the transceiver transmits to the BS a first message comprising a first parameter indicating a default length of the listening window and a second parameter indicating extensibility of the listening window.

15. The MS apparatus of claim 13, wherein the transceiver transmits to the BS a second message comprising a first parameter indicating a default length of the listening window and a second parameter indicating extensibility of the listening window.

16. The MS apparatus of claim 15, wherein the second message further comprises a third parameter indicating whether the second message is transmitted in response to a first message transmitted by the MS or transmitted in an unsolicited manner.

17. The MS apparatus of claim 13, further comprising:
starting the timer if the MS receives first indication information indicating whether there is data which the BS transmits to the MS by including an identifier of the MS in the first indication information.

18. The MS apparatus of claim 13, further comprising:
waiting for retransmission of the data based on the first signaling information without entering the sleep state if the MS fails to decode the data.

19. A Base Station (BS) apparatus for controlling a communication of a Mobile Station (MS), the apparatus comprising:
a controller configured to:
start a timer for a listening window corresponding to a listening state if the BS transmits first resource allocation information indicating a first resource for data communication to the MS,
restart the timer in order to extend the listening window if the BS transmits second resource allocation information indicating a second resource for data communication to the MS,
determine that the MS is maintaining the listening state by extending the listening window, until the timer expires, and
determine that the MS has transitioned to a sleep state if the timer expires; and a transceiver configured to:
communicate first data with the MS on the first resource indicated by the first resource allocation information, and
communicate second data with the MS on the second resource indicated by the second resource allocation information,
wherein the MS operates a sleep cycle comprising the listening window and a sleep window corresponding to the sleep state,
wherein a length of the sleep cycle is changed to double a length of a previous sleep cycle, if there is no data traffic between the MS and the BS during a previous listening window included in the previous sleep cycle or if a negative indication is included in traffic indication information transmitted to the MS, and
wherein a length of a listening window included in the sleep cycle is the same as the previous listening window.

20. The BS apparatus of claim 19, wherein the transceiver receives from the MS a Sleep Request (SLP-REQ) message comprising a first parameter indicating a default length of the listening window and a second parameter indicating extensibility of the listening window.

21. The BS apparatus of claim 19, wherein the transceiver transmits to the MS a second message comprising a first parameter indicating a default length of the listening window and a second parameter indicating extensibility of the listening window.

22. The BS apparatus of claim 21, wherein the second message further comprises a third parameter indicating whether the second message is transmitted in response to a first message received from the MS or transmitted in an unsolicited manner.

23. The BS apparatus of claim 19, further comprising:
starting the timer if the BS transmits first indication information indicating whether there is data which the BS transmits to the MS by including an identifier of the MS in the first indication information.

24. The BS apparatus of claim 19, further comprising:
determining that the MS waits for retransmission of the data based on the first signaling information without entering the sleep state if the MS fails to decode the data.

* * * * *